3,164,442
FLAME SYNTHESIS OF FINELY DIVIDED ALUMI-
NUM BORATES AND PHOSPHATES
Heinrich Bommer, deceased, late of Altenhain, Taunus,
Germany, by Helene Bommer, widow and heir, and
legal representative of minor heirs, Altenhain, Taunus,
Germany, Heinz Dieter Bommer, heir, Altenhain,
Taunus, Germany, and Helmut Brünner, Rheinfelden,
Germany, assignors to Deutsche Gold- und Silber-
Scheideanstalt vormals Roessler, Frankfurt am Main,
Germany
No Drawing. Filed Nov. 22, 1961, Ser. No. 154,938
Claims priority, application Germany, Nov. 25, 1960,
D 34,814
5 Claims. (Cl. 23—59)

The present invention relates to a process for the production of salts and saltlike compounds of small particle size and large specific surface area.

The object of the present invention is to avoid a liquid phase as the reaction medium in the production of salts from acid forming and base forming components as in general, when liquid phase reaction mediums are employed, the salts produced must be recovered by crystallization from solvents and therefore, unless special and usually costly measures are employed, the products are obtained in the form of well defined crystals and therefore in the form of coarse particles and therefore without the advantageous properties, particularly with regard to reactivity, which, for example, can be attained by providing a product having a large specific surface area.

It is already known that oxides of metals and metalloids of extremely fine particle size and a corresponding high activity can be produced by reacting a volatile compound of the oxide forming element in the gas phase an oxygen atmosphere or a water vapor containing medium in a flame. In order to obtain a small particle size of below 100 m$\mu$ and an active surface it is necessary that the oxidation or hydrolyzation reaction occur as quickly as possible and that the oxide produced be quickly removed from the hot reaction zone in order to avoid recrystallizations or changes in the surface characteristics by heating of defect locations and lattice disturbances.

According to the invention it has been found that the reaction of acid forming elements or their volatile compounds with volatile compounds of base forming elements in the flame and in the gas phase in the presence of oxygen or oxygen containing gases leads to good yields of salts or saltlike compounds of extraordinarily small particle size, for example, sizes of the order of between 5 and 100 m$\mu$ and of a specific surface area (measured according to BET) of 40 m.$^2$/g. and more.

In practical application of the process according to the invention a volatile compound of a base forming element, such as, for example, aluminum, is supplied in the vapor state to a flame burning in oxygen or air while simultaneously supplying the vapor of an acid forming element to such flame. For example, according to the invention aluminum chloride vapor can be reacted in a flame of phosphorus vapor and thus obtain aluminum phosphate. Generally it is expedient to supply the vapors of the reaction components to the flame with the aid of air as a carrier gas. In the example selected the salt is obtained by the oxidation of phosphorus and the reaction with the volatile aluminum compound, such as aluminum chloride, with the formation of chlorine more or less in the form of an aerosol as it is suspended in the nitrogen and chlorine containing exhaust gases. The separation of the solid salt from the gaseous reaction products, if necessary, after effecting a coagulation, is carried out in the usual manner with filters, cyclones and the like.

According to a preferred embodiment of the process according to the invention the acid forming elements are also supplied to the reacting flame in the form of their volatile compounds. Acid halides have proved particularly adapted for this purpose. Halides and especially chlorides are preferably employed as the volatile compounds of the base forming elements.

Instead of employing a pure oxidation reaction as indicated above, the decomposition of the volatile compounds of the acid forming and base forming elements can also be effected over a hydrolytic process in that the components are supplied to a flame of hydrogen or hydrogen containing or forming gases and oxygen containing mixtures such as air. In this embodiment of the process of the invention the entire reaction includes water formation (by flame), hydrolysis of the components and in some instances their oxidation as well as salt formation and dehydration of the salt. When halides are employed as starting materials hydrogen halide is produced as a gaseous reaction product instead of the halogen as is obtained when the salt formation is oxidative.

In order to obtain the salts or saltlike substances of as uniform a particle size as possible, that is, with distribution of their particle sizes within a narrow range, it is advisable to supply the reaction components, such as, for example, an acid chloride, a metal halide, hydrogen and air, to the flame in an already extensively mixed state. This, for example, can be accomplished by passing the components through a mixing chamber wherein an intensive turbulence is effected by introducing some of the components tangentially and the others axially before they are introduced into the flame. The mixture thus obtained is then calmed down on its way to the flame with the aid of guiding plates and introduced into the flame with as uniform a non-turbulent (laminar) flow as possible. This renders it possible to provide a uniform concentration of the reaction components in each part of the flame so that substantially uniform reaction conditions are provided for the formation of the salt. The requirements for the formation of salts of uniform particle size and properties are thus provided.

For these reasons it is also advisable, when a water forming flame is used, in which hydrogen or hydrogen containing gases are burned with oxygen and/or other oxidizing gases, to meter the oxygen or the oxidizing gas in the reacting mixture so that the ratio thereof to the hydrogen or hydrogen supplying gas is at least stoichiometric, that is, that the oxygen component in the gas mixture is at least sufficient for the complete conversion of the hydrogen component into water. Even though ignitable mixtures are supplied to the flame in this embodiment of the process according to the invention, appropriate adjustment of the velocity of the gas mixtures supplied to the flame with reference to their ignition velocity, a premature occurrence of the reaction in the supply conduits, as well as striking back of the flame, can be effectively avoided.

The particle size of the salt produced can be varied within certain limits by varying the loading of the carrier or respectively combustion gases with which the salt forming components are supplied to the flame. As indicated above, oxygen or air or also hydrogen, or hydrogen containing gases, such as methane, illuminating gas and the like, can serve as carrier gases. It was found that the size of the salt particles produced is the smaller the lower the loading of the total quantity of gas with the vapors of the actual salt forming reaction components.

A particular advantage of the process according to the invention is that it renders it possible to produce products by deviating from the proportion of the salt forming reaction components required for the stoichiometric production of the salts which are modified with regard to their chemical character by the presence of an excess of either the acid or base forming component without altering their physical properties. For example, acid aluminum phosphates can thus be easily obtained by supplying a stoichiometric excess of $PCl_3$ to the reaction.

As normally gas flow velocities in excess of 10 m./sec. must be employed, the reaction products are rapidly removed from the flame and are subjected to relatively rapid cooling without it being necessary to quench the salt by spraying in water which would result in the production of aqueous solutions which would be contrary to the object of the invention to produce finely divided salts of large surface area directly.

As the salt particles are formed in an extremely finely divided state it is expedient to provide for a coagulation of the particles from the aerosol state to be able to effect easy and economical recovery and especially for providing for a high efficiency in the cyclones which are expediently employed as separators. According to an especially successful embodiment of the process according to the invention, the aerosol particles in the gas stream leaving the flame are either passed through large chambers under turbulent conditions or passed through long, preferably bent, tubes with turbulent flow so that the small solid particles are maintained in suspension for some time, for example, longer than 3 seconds or more than 5 seconds, to effect far reaching coagulation of the aerosol particles to an aerogel. After the coagulation thus achieved the salts can be recovered without difficulty in known apparatus and particularly in cyclones. However, it is also possible to separate off the salt particles produced directly after adequate cooling without traversing a distance sufficient to effect coagulation. In this instance, however, the cyclones employed are not only required to perform the separation but also to carry out the coagulation procedure.

The products obtained according to the invention are distinguished by their extremely fine particle size and large surface area and their relatively low bulk specific gravity. They therefore can be used with special advantage in all instances where specific surface properties of fine particles are desired, such as in thickening agents for liquids, fillers of all types or as catalysts and also in all instances where high reactivity is desired. In addition to their specific chemical properties resulting from their composition they also have the properties of highly dispersed substances. These properties above all are engendered by their formation in the gas phase and they therefore differ in a characteristic manner from those of products of a known process in which a non-volatilized halide, namely, sodium chloride, is supplied to a burning phosphorus flame under exclusion of water vapor.

The following examples will serve to illustrate several embodiments of the invention.

Example 1

A mixture of 1.3 m.$^3$/h. of hydrogen, 3.5 m.$^3$/h. of air and 0.15 m.$^3$/h. of nitrogen was supplied to a usual tube burner having a burner opening 7 mm. in diameter corresponding to a burner cross-sectional area of 0.38 cm.$^2$. The air in such mixture was loaded with 0.25 kg./h. of $Al_2Cl_6$ and the nitrogen with 0.62 kg./h. of $PCl_3$. The loading was effected in separate evaporators of which the one for the $Al_2Cl_6$ was maintained at 200° C. and that for the $PCl_3$ at 55° C. Therefore with reference to the total quantity of gas of 4.95 m.$^3$/h., the loading with $Al_2Cl_6$ was 110 g./m.$^3$ and with $PCl_3$ was 128 g./m.$^3$. The velocity of the gas stream flowing out of the burner was 35 m./sec. at a pressure of 700 mm. water column. The $AlPO_4$ produced in the flame was recovered in a cyclone. The yield was 80% with reference to the $Al_2Cl_6$ supplied. The BET surface area of the aluminum phosphate produced was found to be 44 m.$^2$/g. The diameter of the particles was $5–200 \times 10^{-6}$.

Example 2

The procedure of Example 1 was repeated except the quantity of hydrogen supplied was 900 liters per hour and the quantity of air 4000 liters per hour and the quantities of $Al_2Cl_6$ and $PCl_3$ supplied were 0.40 kg./h. and 0.41 kg./h. respectively. The velocity of the gas stream leaving the burner again was 35 m./sec. A 70% yield of $AlPO_4$ based on the starting materials was obtained. The product was white and had a bulk weight of 110 g./liter and a shaken weight of 145 g./liter. The BET surface area was 60 m.$^2$/g.

Example 3

The procedure of Example 2 was repeated except that the 0.41 kg./h. of $PCl_3$ was replaced by 0.41 kg./h. of $BCl_3$. In a 3½ hour run $AlBO_3$ with a 70% yield with reference to the $Al_2Cl_6$ and $BCl_3$ supplied was obtained. The product was white and had a bulk weight of 110 g./liter. Its content of $Al_2O_3$ was 59.4% (theoretically 59.4%) and the content of $B_2O_3$ 36.6% (theoretically 40.6%)

Example 4

The procedure of Example 1 was repeated. 0.27 kg./h. of $Pb(CH_3)_4$, 0.13 kg./h. of $SO_2Cl_2$, 170 l./h. of oxygen and 200 l. of air together with 500 l. hydrogen were supplied to the tube burner. The velocity of the gas stream flowing out of the burner was 30 m./sec. at a pressure of about 750 mm. water column. The yield of $PbSO_4$ was 70%. The BET surface area of $PbSO_4$ produced was found to be 20 to 30 m.$^2$/g.

We claim:

1. A process for the production of a finely divided salt selected from the group consisting of aluminum phosphates and aluminum borates which comprises vaporizing an aluminum halide, vaporizing an acid halide selected from the group consisting of phosphorus halides and boron halides, mixing the vapors thus produced in proportions which are stoichiometric for the salt formation, supplying such mixture of vapors to a flame produced by the combustion of a hydrogen containing gas and oxygen wherein such mixture of vapors undergoes a hydrolyzation reaction with the formation of the solid salt in aerosol form and separating the salt thus produced from the gaseous reaction products.

2. The process of claim 1 in which the quantity of oxygen supplied to the flame is at least sufficient to form water with all of the hydrogen contained in the hydrogen containing gas supplied to such flame.

3. The process of claim 1 in which the aluminum halide is aluminum chloride and the acid halide is boron trichloride.

4. The process of claim 1 in which said aluminum halide is aluminum chloride and said acid halide is phosphorus trichloride.

5. The process of claim 1 in which the solid particles formed as an aerosol are maintained in suspension after leaving the flame for a sufficient period of time to effect substantial coagulation thereof to an aerogel before being separated from the gaseous reaction products.

References Cited by the Examiner
UNITED STATES PATENTS

| | | | |
|---|---|---|---|
| 2,142,944 | 1/39 | Kerschbaum | 23—106 |
| 2,266,328 | 12/41 | McCullough | 23—106 |
| 2,792,285 | 5/57 | Alexander et al. | 23—1 X |
| 2,985,506 | 5/61 | Di Vita et al. | 23—51 |
| 2,988,422 | 6/61 | Walsh | 23—51 |
| 2,988,424 | 6/61 | Walsh | 23—143 |

MAURICE A. BRINDISI, *Primary Examiner.*